(12) United States Patent
Han et al.

(10) Patent No.: US 10,751,701 B2
(45) Date of Patent: Aug. 25, 2020

(54) OXIDATION CATALYST FOR COMPRESSED NATURAL GAS COMBUSTION SYSTEM EXHAUST GAS

(71) Applicant: HEESUNG CATALYSTS CORPORATION, Gyeonggi-do (KR)

(72) Inventors: Hyun-sik Han, Seoul (KR); Eun-seok Kim, Gyeonggi-do (KR); Mi-Young Kim, Gyeonggi-do (KR); Jun hong Jeon, Gyeonggi-do (KR)

(73) Assignee: HEESUNG CATALYSTS CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/064,269

(22) PCT Filed: Dec. 16, 2016

(86) PCT No.: PCT/KR2016/014808
§ 371 (c)(1),
(2) Date: Jun. 20, 2018

(87) PCT Pub. No.: WO2017/111397
PCT Pub. Date: Jun. 29, 2017

(65) Prior Publication Data
US 2019/0001304 A1   Jan. 3, 2019

(30) Foreign Application Priority Data
Dec. 23, 2015  (KR) .................. 10-2015-0184454

(51) Int. Cl.
*B01J 23/42*  (2006.01)
*B01J 21/04*  (2006.01)
(Continued)

(52) U.S. Cl.
CPC ............... *B01J 23/42* (2013.01); *B01J 21/04* (2013.01); *B01J 23/02* (2013.01); *B01J 23/10* (2013.01);
(Continued)

(58) Field of Classification Search
CPC ... B01J 23/42; B01J 21/04; B01J 23/02; B01J 23/10; B01J 23/44; B01J 23/58;
(Continued)

(56) References Cited

U.S. PATENT DOCUMENTS 5,063,192 A * 11/1991 Murakami ........... B01D 53/945
                                                    502/303
7,329,629 B2   2/2008 Gandhi et al.
(Continued)

FOREIGN PATENT DOCUMENTS

KR        10-0230874 B1    11/1999
KR    10-2003-0024085 A     3/2003
(Continued)

OTHER PUBLICATIONS

Konsolakis, M. et al., The Reduction of NO By Propene Over Ba-promoted Pt/γ-Al$_2$O$_3$ Catalysts. J Catal. 2001; 198(1):142-50.
(Continued)

*Primary Examiner* — James A Fiorito
(74) *Attorney, Agent, or Firm* — Ballard Spahr LLP

(57) ABSTRACT

The present invention provides a catalyst composition for inhibiting the inactivation of a catalyst for purification of compressed natural gas combustion system exhaust gas on which a noble metal component comprising platinum and palladium is supported. An oxidation catalyst, for a compressed natural gas vehicle or static combustion system exhaust gas, in which a first alumina impregnated with platinum, a second alumina impregnated with palladium, and a ceria component are supported on a ceramic support,
(Continued)

has a barium cocatalyst supported on the first alumina, thereby greatly inhibiting inactivation of a CNG lean burn engine catalyst.

7 Claims, 5 Drawing Sheets

(51) Int. Cl.
| | |
|---|---|
| *B01J 23/44* | (2006.01) |
| *F01N 3/10* | (2006.01) |
| *F02B 43/00* | (2006.01) |
| *B01J 37/02* | (2006.01) |
| *B01J 35/00* | (2006.01) |
| *B01J 23/63* | (2006.01) |
| *B01J 23/58* | (2006.01) |
| *B01J 23/02* | (2006.01) |
| *B01J 23/10* | (2006.01) |
| *F02B 43/04* | (2006.01) |
| *F02B 43/10* | (2006.01) |

(52) U.S. Cl.
CPC ............ *B01J 23/44* (2013.01); *B01J 23/58* (2013.01); *B01J 23/63* (2013.01); *B01J 35/0006* (2013.01); *B01J 37/0205* (2013.01); *B01J 37/0215* (2013.01); *B01J 37/0248* (2013.01); *F01N 3/10* (2013.01); *F02B 43/00* (2013.01); *F02B 43/04* (2013.01); *F02B 2043/103* (2013.01); *Y02A 50/2322* (2018.01); *Y02T 10/32* (2013.01)

(58) Field of Classification Search
CPC .... B01J 23/63; B01J 35/0006; B01J 37/0205; B01J 37/0215; B01J 37/0248; F01N 3/10; F02B 43/00; F02B 43/04
See application file for complete search history.

(56) References Cited

U.S. PATENT DOCUMENTS

| | | | |
|---|---|---|---|
| 7,576,031 | B2 | 8/2009 | Beutel et al. |
| 7,923,407 | B2 | 4/2011 | Goto |
| 8,808,653 | B2 | 8/2014 | Mikita et al. |
| 8,877,675 | B2 | 11/2014 | Nakamura et al. |
| 9,931,615 | B2 | 4/2018 | Han et al. |
| 2002/0081255 | A1 | 6/2002 | Cutler et al. |
| 2007/0093383 | A1 | 4/2007 | Han et al. |
| 2007/0219089 | A1 | 9/2007 | Goto |
| 2008/0167181 | A1 | 7/2008 | Nakamura et al. |
| 2010/0183490 | A1 | 7/2010 | Hoke et al. |
| 2012/0027654 | A1 | 2/2012 | Mikita et al. |

FOREIGN PATENT DOCUMENTS

| | | |
|---|---|---|
| KR | 10-0461125 B1 | 12/2004 |
| KR | 10-0670221 B1 | 1/2007 |
| KR | 10-2007-0094493 A | 9/2007 |
| KR | 10-2008-0065921 A | 7/2008 |
| KR | 10-2011-0129381 A | 12/2011 |
| KR | 10-1524054 B1 | 5/2015 |

OTHER PUBLICATIONS

May, J., CAPoC8: 8th International Congress on Catalysis and Automotive Pollution Control—Focus on $No_x$ Control and Particulate Filtration for Diesel Engines. Platinum Metals Rev. 2010; 54(2):88-92.
Rankovic, N. et al., Detailed Kinetic Modeling Study of Nox Oxidation and Storage and Their Interactions over $Pt/Ba/Al_2O_3$ Monolith Catalysts. J Phys Chem C. 2010; 114(15):7102-11.
International Search Report dated Feb. 15, 2017 by the International Searching Authority for Patent Application No. PCT/KR2016/014808, which was filed on Dec. 16, 2016 and published as WO 2017/111397 on Jun. 29, 2017 (Inventor—Han et al.; Applicant—Heesung Catalysts Corporation) (Original—3 pages; Translation—2 pages).
International Search Report dated Feb. 12, 2015 by the International Searching Authority for Patent Application No. PCT/KR2014/012382, which was filed on Dec. 16, 2014 and published as WO 2015/09948 on Jul. 2, 2015 (Inventor—Han et al.; Applicant—Heesung Catalysts Corp.) (Translation Only—2 pages).
International Preliminary Report on Patentability dated Jun. 28, 2016 by the International Searching Authority for Patent Application No. PCT/KR2014/012382, which was filed on Dec. 16, 2014 and published as WO 2015/09948 on Jul. 2, 2015 (Inventor—Han et al.; Applicant—Heesung Catalysts Corp.) (Original—5 pages; Translation—5 pages).

\* cited by examiner

[FIG. 1]
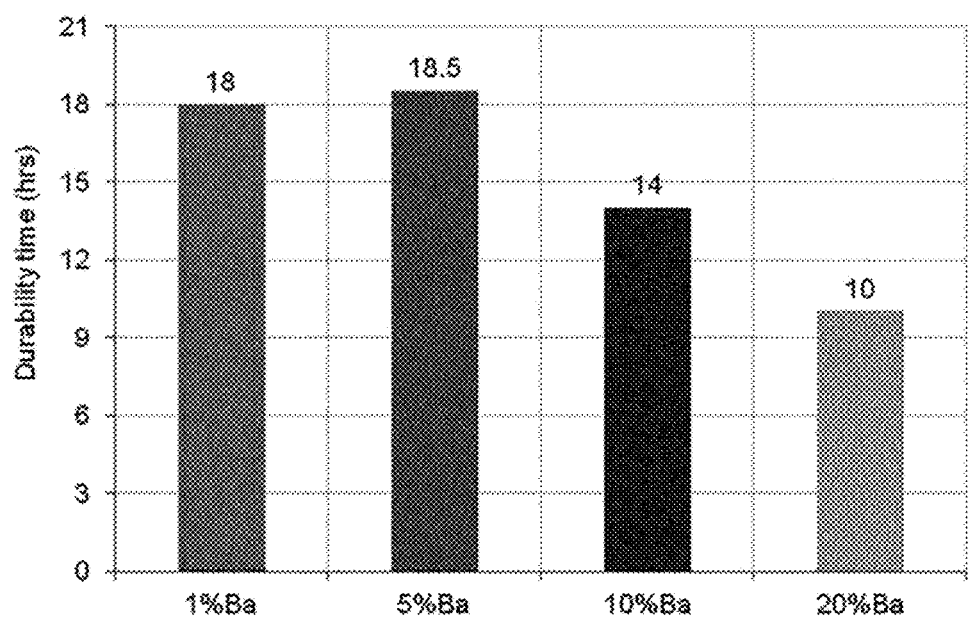

[FIG. 2]
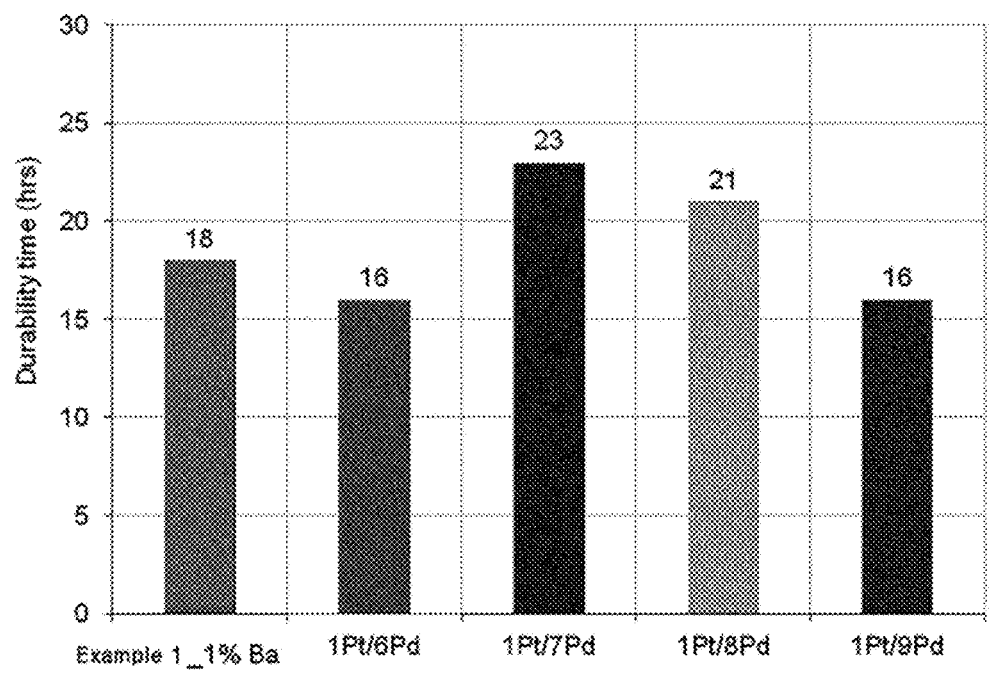

[FIG. 3]
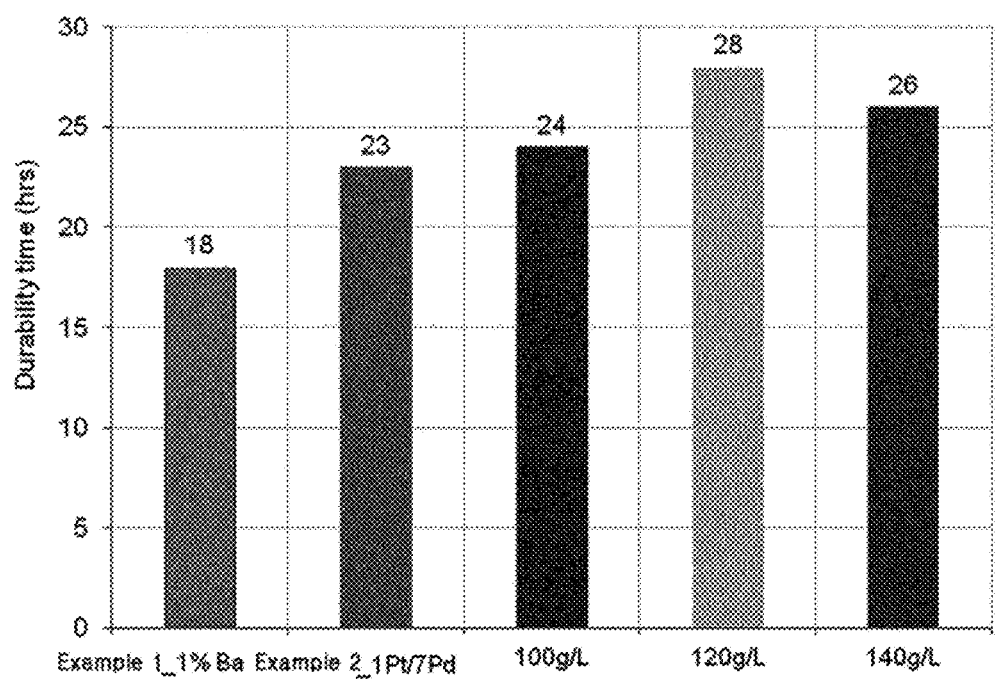

[FIG. 4]
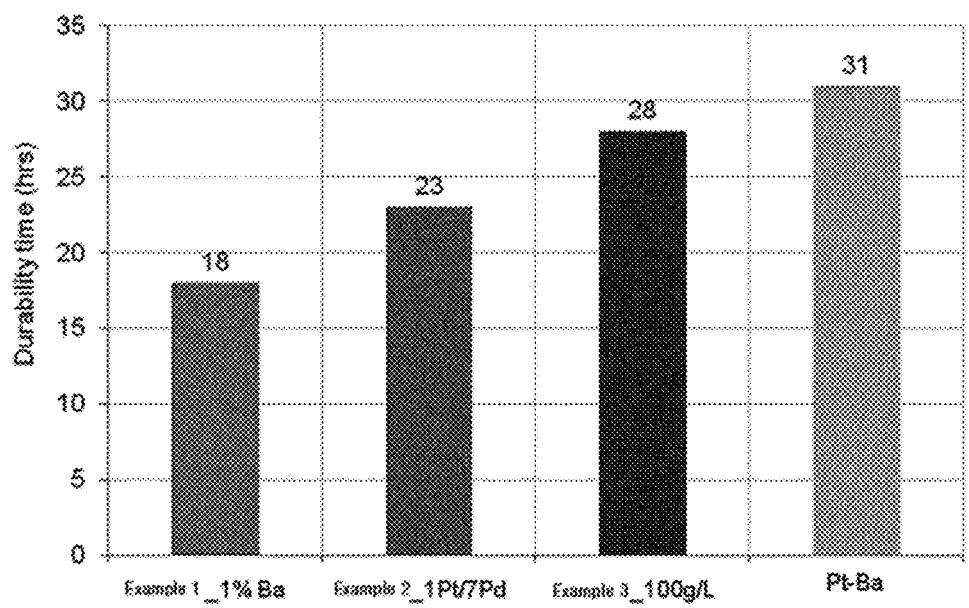

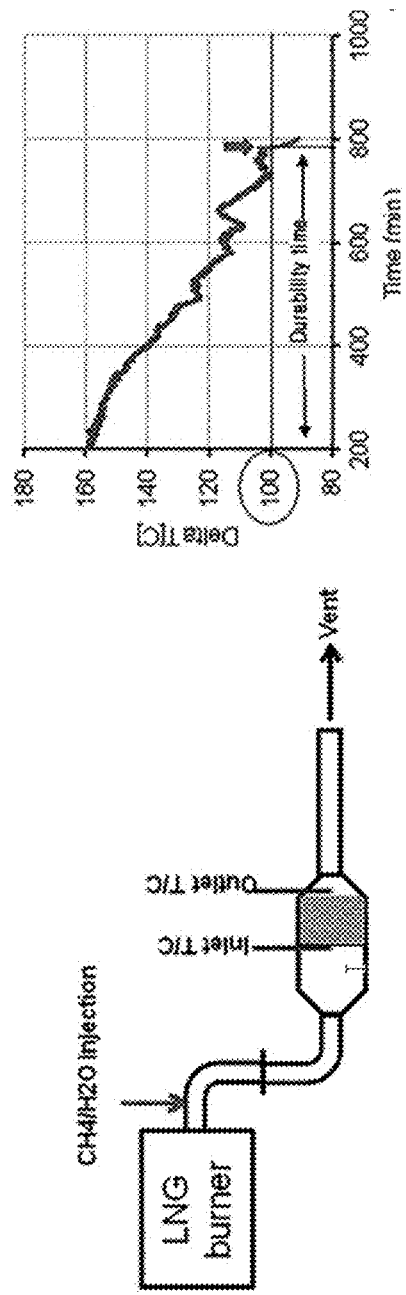
[FIG. 5]

OXIDATION CATALYST FOR COMPRESSED NATURAL GAS COMBUSTION SYSTEM EXHAUST GAS

CROSS-REFERENCE TO RELATED APPLICATIONS

This application is a U.S. National Phase Application of International Application No. PCT/KR2016/014808, filed Dec. 16, 2016, which claims priority to Korean Application No. 10-2015-0184454, filed Dec. 23, 2015, each of which are hereby incorporated by reference in their entirety.

TECHNICAL FIELD

The present invention relates to an exhaust gas oxidation catalyst for a compressed natural gas combustion system, and more particularly to an exhaust gas purification catalyst for a compressed natural gas lean-burn engine, in which a conventional exhaust gas purification catalyst for a compressed natural gas lean-burn engine, loaded with noble metal components containing platinum and palladium, is further impregnated with a specific component serving as a cocatalyst to thus prevent catalyst deactivation.

BACKGROUND ART

The use of CNG (Compressed Natural Gas) as fuel in a combustion system including a vehicle engine is environmentally friendly, generates economic benefits, and is characterized by low emission of toxic materials such as HC, CO, and PM (Particulate Matter), thus leading to almost none of the odors and fumes of exhaust gas. In the present invention, a combustion system includes a vehicle engine, and in some cases, a combustion system other than one for a vehicle is also called a static combustion system, which is distinguished from one for a vehicle, that is, a dynamic combustion system.

In the related art with regard to an exhaust gas purification catalyst for a compressed natural gas vehicle and a purification method thereof, Korean Patent No. 670221 by the present applicant discloses, as an exhaust gas oxidation catalyst for a compressed natural gas vehicle, loaded with noble metal components containing palladium and platinum, a catalyst for improving oxidation activity on exhaust gas from a compressed natural gas vehicle, which is configured such that palladium-impregnated first alumina, platinum-impregnated second alumina, $CeO_2$—$ZrO_2$ composite ceria and nickel oxide are loaded on a ceramic support. Also, as disclosed in Korean Patent No. 1524054 by the present applicant, an exhaust gas oxidation catalyst for a compressed natural gas combustion system, particularly a catalyst for improving oxidation activity on exhaust gas from a compressed natural gas vehicle or static combustion system in excess air, is configured such that palladium-impregnated first alumina, platinum-impregnated second alumina, and a ceria component are loaded on a ceramic support and the first alumina is impregnated with a cocatalyst selected from the group consisting of barium, nickel, lanthanum, samarium and yttrium so as to improve oxidation activity on methane, which is an exhaust gas component from a compressed natural gas vehicle or static combustion system, in excess air.

DISCLOSURE

Technical Problem

A currently useful catalyst for purifying CNG exhaust gas from a CNG engine operating in a fuel lean-burn atmosphere is problematic in terms of catalyst durability, that is, catalyst deactivation. The causes of deactivation of a platinum/palladium-based catalyst for purifying exhaust gas from a CNG lean-burn engine have not been accurately identified. The present applicant has developed a catalyst for solving the problem of deactivation of a CNG lean-burn engine catalyst in such a manner that, in an exhaust gas oxidation catalyst for a compressed natural gas combustion system, configured such that palladium-impregnated first alumina, platinum-impregnated second alumina, and a ceria component are loaded on a ceramic support, the palladium-impregnated first alumina is further impregnated with a cocatalyst selected from the group consisting of barium, nickel, lanthanum, samarium, and yttrium, but a solution for the catalyst deactivation is still desired.

Technical Solution

Therefore, the present invention is intended to provide a catalyst composition for preventing the deactivation of an exhaust gas purification catalyst for a compressed natural gas combustion system, loaded with noble metal components containing platinum and palladium. The present inventors have ascertained that a barium component serving as a cocatalyst is added to a support containing platinum loaded thereon to thus improve catalyst durability, unlike the conventional art. Specifically, in an exhaust gas oxidation catalyst for a compressed natural gas combustion system, configured such that platinum-impregnated first alumina, palladium-impregnated second alumina, and a ceria component are loaded on a ceramic support, the platinum-impregnated first alumina is further impregnated with a barium cocatalyst, by which prevention of the deactivation of the CNG lean-burn engine catalyst has been confirmed. Without limitation thereto, in the present invention, the weight ratio of platinum and palladium impregnated respectively on the first alumina and the second alumina fall in the range of 1:1 to 1:10. According to the present invention, the barium cocatalyst is added in an amount of 1 to 20 wt % based on the amount of platinum, and the weight ratio of the platinum-impregnated alumina and the palladium-impregnated alumina fall in the range of 15:15 to 15:150.

Advantageous Effects

According to the present invention, the deactivation of a CNG lean-burn engine catalyst can be prevented by virtue of the interaction between platinum and a barium cocatalyst.

DESCRIPTION OF DRAWINGS

FIGS. 1 to 4 show the results of catalytic activity over time in the CNG lean-burn engine exhaust gas catalyst in Examples according to the present invention; and FIG. 5 schematically shows the testing of durability of the CNG lean-burn engine exhaust gas catalyst according to the present invention.

BEST MODE

Hereinafter, a detailed description will be given of the present invention, without limitation to embodiments thereof.

As described above, the catalyst for purifying CNG lean-burn engine exhaust gas is composed mainly of platinum (Pt) and palladium (Pd). The most recently developed catalyst is configured such that a cocatalyst is introduced adjacent to Pd based on the fact that Pd has superior oxidation performance compared to Pt in terms of methane conversion efficiency. Specifically, a support containing Pd loaded thereon is added with a cocatalyst such as barium, nickel, lanthanum, samarium or yttrium, in which the cocatalyst component contributes to catalyst durability by altering the electron state of Pd due to complexation. Unexpectedly, however, the present inventors have ascertained that catalyst durability may be improved as a result of introducing a cocatalyst component, particularly barium, adjacent to a platinum component, rather than palladium.

According to the present invention, the catalyst is prepared by impregnating first alumina with Pt and a cocatalyst precursor, particularly barium acetate, and simultaneously impregnating second alumina with Pd, mixing the first alumina with the second alumina, and adding ceria thereto, followed by uniform milling and firing. Preferably, the weight ratio of platinum and palladium, impregnated respectively on the first alumina and the second alumina, falls in the range of 1:1 to 1:10, and the barium cocatalyst is further added in an amount of 1 to 20 wt % based on the amount of platinum to the support containing platinum loaded thereon, and the weight ratio of the platinum-barium-impregnated alumina and the palladium-impregnated alumina preferably falls in the range of 15:15 to 15:150. If the amount of the cocatalyst according to the present invention is less than 1 wt % based on the amount of platinum, the cocatalyst does not function. On the other hand, if the amount thereof exceeds 20 wt % based on the amount of platinum, durability is significantly worsened. The catalyst according to the present invention is configured such that the barium cocatalyst is impregnated only on the platinum-impregnated support and is not loaded on the support impregnated with the other noble metal, for example, palladium, unlike the recently developed palladium-cocatalyst-based catalyst. The above weight ratio of the platinum-barium-impregnated alumina and the palladium-impregnated alumina is an optimal range obtained through a numerous variety of tests. Although not delineated in any particular theory, the cocatalyst component enhances catalyst durability through the interaction with the platinum component. The catalyst of the invention is not deactivated and the activity thereof is still maintained even after the reaction time, unlike the conventional CNG lean-burn engine exhaust gas catalyst. FIGS. 1 to 4 show the catalytic activity over time in the CNG lean-burn engine exhaust gas catalyst in Examples according to the present invention. Based on the test results shown in FIGS. 1 to 4, the catalyst according to the present invention was hydrothermally aged at 850° C./10 hr with 10% water by supplying 5,000 ppm $CH_4$, 15% $O_2$, 10% $H_2O$, and the balance of $N_2$ at a space velocity (SV) of 60,000 l/hr. Here, delta T indicates the difference in temperature between the catalyst outlet and the catalyst inlet. FIG. 5 schematically shows the durability test. The cocatalyst of the present invention, that is, barium, is additionally incorporated to the platinum-impregnated support. The effect of preventing deactivation by the Ba cocatalyst added to the platinum component significantly increases durability compared to the Ba cocatalyst conventionally added to the palladium component.

A better understanding of the present invention will be given through the following examples, which are not to be construed as limiting the present invention. In particular, the noble metal and the precursor of the metal used for the cocatalyst are not limited by the examples, and nitrate, acetate, chloride, sulfate, and the like are variously used. For the sake of brief description, a lean-burn engine vehicle is exemplified, but the present invention is not limited thereto, and may be applied to all combustion systems using compressed natural gas as fuel.

Comparative Example 1

CNG-Comparison a. 15.0 g/l of a first alumina powder was impregnated with chloroplatinic acid and 80.0 g/l of a second alumina powder was impregnated with palladium nitrate and barium acetate (in an amount of 10 wt % based on the amount of Pd), thus preparing Pt-impregnated active alumina and Pd—Ba-impregnated active alumina, and a ceria powder (alumina 5 wt %) was dispersed in water to give a slurry. Here, the weight ratio of Pt and Pd was 1:5.

b. The slurry was milled such that about 90% thereof had a particle size of 6 to 8 μm, and the treated slurry was applied on a cordierite honeycomb, dried at 150° C. to 160° C. for about 10 min, and then fired at 530° C. to 550° C. for about 40 to 60 min, thereby completing a comparative catalyst.

Comparative Example 2

The same procedures as in Comparative Example 1 were performed, with the exception that the amount of barium was changed to 1 wt %, 5 wt % and 20 wt % based on the amount of Pd. The results are shown in FIG. 1. When the amount of barium was 20 wt % or more, durability was drastically deteriorated. 1 wt % barium and 5 wt % barium had no great influence on durability. Thus, the catalyst of the present invention was designed based on 1 wt % barium.

Comparative Example 3

The same procedures as in Comparative Example 1 were performed, with the exception that the amount of barium was fixed to 1 wt % based on the amount of Pd and that the weight ratio of Pt and Pd was changed from 1:5 to 1:6, 1:7, 1:8, and 1:9. The results are shown in FIG. 2. Durability was optimized at 1Pt/7Pd. Thus, the catalyst of the present invention was designed based on 1Pt/7Pd.

Comparative Example 4

The same procedures as in Comparative Example 1 were performed, with the exception that the amount of barium was fixed to 1 wt % based on the amount of Pd and that the weight ratio of Pt and Pd was fixed to 1:7, and the amount of the second alumina powder applied to Pd was changed from 80 g/l to 100 g/l, 120 g/l and 140 g/l. The results are shown in FIG. 3. Durability was optimized at 120 g/l. Thus, the catalyst of the present invention was designed based thereon.

EXAMPLES

On the basis of the above Comparative Examples, a platinum-barium catalyst was prepared under conditions in which the amount of barium was set to 1 wt % based on the amount of Pt, the weight ratio of platinum and palladium was 1:7, the amount of the second alumina powder as the palladium support was set to 120 g/L, and the impregnation position of the barium cocatalyst was changed, after which the durability of the catalyst was tested. The results are shown in FIG. 4. Surprisingly, catalyst durability was improved by changing the impregnation position of the barium cocatalyst from palladium to platinum. Although those skilled in the art considered the contribution of the cocatalyst to catalyst durability by altering the electron state through complexation with palladium, unexpectedly, it was confirmed that catalyst deactivation could be prevented by impregnating the barium cocatalyst together with platinum.

The invention claimed is:

1. A catalyst for improving oxidation activity on methane from an exhaust gas from a compressed natural gas vehicle or static combustion system in excess air consisting essentially of a platinum-impregnated first alumina, a palladium-impregnated second alumina and a ceria component loaded on a ceramic support and the first alumina is further impregnated with a barium cocatalyst, wherein the barium cocatalyst is added in an amount of 1 to 10 wt % based on an amount of platinum.

2. The catalyst of claim 1, wherein a weight ratio of platinum and palladium impregnated respectively on the first alumina and the second alumina is 1:1 to 1:10.

3. A catalyst for improving oxidation activity on methane from an exhaust gas from a compressed natural gas vehicle or static combustion system in excess air comprising a platinum-impregnated first alumina, a palladium-impregnated second alumina and a ceria component loaded on a ceramic support, wherein the platinum-impregnated first alumina is further impregnated with a barium cocatalyst, wherein the barium cocatalyst is added in an amount of 1 to 10 wt % based on an amount of platinum, and wherein the palladium-impregnated second alumina is not impregnated with a barium cocatalyst.

4. The catalyst of claim 1, wherein the catalyst consists of a platinum-impregnated first alumina, a palladium-impregnated second alumina and a ceria component loaded on a ceramic support and the first alumina is further impregnated with a barium cocatalyst, wherein the barium cocatalyst is added in an amount of 1 to 10 wt % based on an amount of platinum.

5. A method for oxidation of methane present in an exhaust gas from a compressed natural gas vehicle or static combustion system in excess air, comprising contacting the exhaust gas from a compressed natural gas vehicle or static combustion system in excess air with the catalyst of claim 1, thereby oxidizing methane present in the exhaust gas from a compressed natural gas vehicle or static combustion system in excess air.

6. A method for oxidation of methane present in an exhaust gas from a compressed natural gas vehicle or static combustion system in excess air, comprising contacting the exhaust gas from a compressed natural gas vehicle or static combustion system in excess air with the catalyst of claim 3, thereby oxidizing methane present in the exhaust gas from a compressed natural gas vehicle or static combustion system in excess air.

7. A method for oxidation of methane present in an exhaust gas from a compressed natural gas vehicle or static combustion system in excess air, comprising contacting the exhaust gas from a compressed natural gas vehicle or static combustion system in excess air with the catalyst of claim 4, thereby oxidizing methane present in the exhaust gas from a compressed natural gas vehicle or static combustion system in excess air.

* * * * *